2,815,573

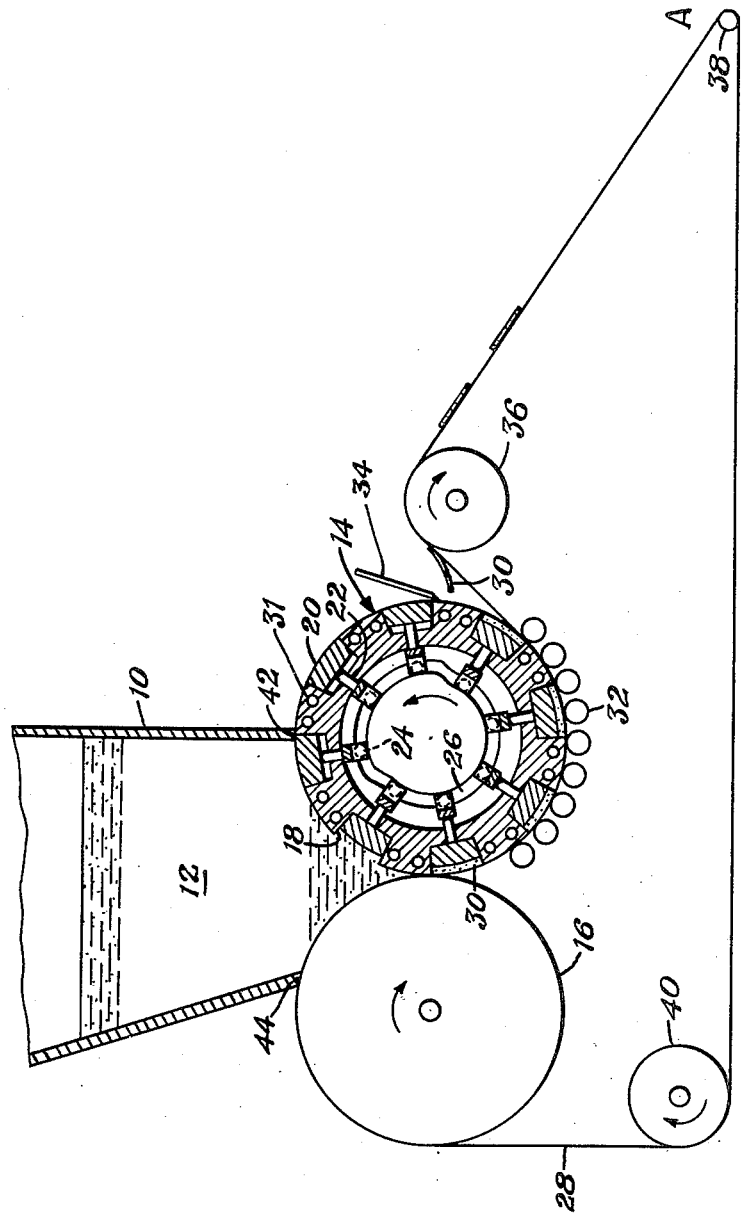

MANUFACTURE OF CHEESE SLICES

Richard D. Trelease, Downers Grove, Ill., assignor to Swift & Company, Chicago, Ill., a corporation of Illinois Application February 26, 1954, Serial No. 412,779

1 Claim. (Cl. 31—10)

The present invention relates generally to apparatus suitable for forming non-adhesive cheese slices. More specifically, the present invention is directed to apparatus capable of imparting to processed cheese a relatively non-tacky surface.

In overcoming the undesirable tacky properties of sliced cheese surfaces, the industry has gone to great lengths in devising different methods. Heretofore, the molten cheese was normally introduced into a mold wherein it set up and formed what is commonly termed a cheese block. The block of cheese was removed from the mold, sliced, and the slices stacked and packaged. Due to several reasons, the slices showed a great tendency to stick together within the package. Subsequent separation of these slices by the consumer quite often resulted in rupturing or tearing of the slices.

The adhesive properties of sliced cheese has generally been considered to be caused by uneven surfaces and excessive moisture. It has more recently been determined that other causes also play an important role in imparting to sliced cheese tacky surfaces. The constituents or components which are utilized to form emulsions from which processed cheese is prepared are characteristically tacky. Upon being intimately mixed, these components have a tendency to adhere randomly to one another rather than orienting themselves as would normally be expected. This lack of orientation adds to the unevenness of the cheese surfaces but cannot be normally corrected by mechanical means.

Of the known techniques devised to overcome some of these problems, the quick-chill technique is probably one of the best. In the following teachings of this technique, the molten cheese may be introduced onto a chilled surface in the form of a thin ribbon, whereupon, due to the sudden chilling action, the cheese sets up and the surfaces formed are comparatively smooth. In order to obtain the best results in utilizing this process, it is necessary to use equipment having an extremely smooth surface for receiving the cheese. The smooth mechanical surface is the only means for supplying to the cheese ribbon a generally smooth surface.

The disadvantages in utilizing the quick chill technique are many. Maintenance of the apparatus used is a big problem in that great care is necessary in order to protect the extremely smooth surface onto which the cheese is introduced. The initial costs in apparatus are high in that the cheese receiving surface must be specially prepared. While the cheese ribbons produced exhibit comparatively non-adhesive surfaces, there is, nevertheless, a certain amount of tackiness which has not been overcome. It has been found that this residue tackiness is present because the cheese, upon being deposited on the chilled surface, does not have an opportunity to allow its constituents to become oriented. As a result, the constituents are still randomly distributed and, due to their inherent tackiness, are combined so as to present an uneven surface. Such a surface exhibits adhesive characteristics even though the surface appears to be relatively smooth. Also, in employing the method whereby the ribbon of cheese are merely quick chilled, many production problems exist. Among these problems is the necessity of trimming the cheese ribbons to bring about a uniformity in the finished product.

It is therefore an object of the present invention to form cheese slices so as to realize all of the advantages which are inherent in the quick chill technique along with the additional advantage derived from allowing the cheese constituents to orient themselves in such a manner so as to reduce the natural tackiness which is normally present.

Another object is to set forth apparatus wherein individual cheese slices are formed without the accompanying waste due to trimming.

Still another object is to provide simplified apparatus which does not require expensive fabrication or maintenance.

Other objects not specifically set forth will become apparent from the following detailed description.

The phenomenon of surface tension plays an important role in carrying out the method of the present invention. As is generally known, liquids or fluidized solids have a tendency along the surface thereof to set up a surface tension. Orientation of molecules or constituents of the material has normally been considered to cause such a film. In the instance where a body of cheese is partially fluidized, the constituents along the surface thereof become oriented in accordance with the principles of surface tension. It has been found that by transferring this orientation of constituents or cheese particles onto the surface of a cheese slice, the cheese surface exhibits non-adhesive characteristics.

The present invention generally comprises the introduction of a closed mold into a body of semi-fluidized cheese, moving the closed mold through the mass of cheese, opening the mold and allowing a quantity of cheese to enter thereinto, removing the mold from the body of cheese, allowing the cheese within the mold to set up therein, and finally removing the finished cheese slice from the mold. A slice of cheese produced in such a manner is properly dimensioned and suitable for packaging without further operation. The surface of the cheese slice exhibits non-adhesive characteristics and may be brought into close contact with the surfaces of other cheese slices without the danger of adherence between the cheese slices.

The present invention may be more adequately described in conjunction with the apparatus which is set forth in the drawing.

In the drawing:

The figure shown is a combined cross-sectional and diagrammatic view of apparatus suitable for use in conjunction with the present invention.

Generally the apparatus involves a hopper 10 suitable for maintaining a mass of molten cheeses 12 in a heated condition. The bottom of the hopper 10 is closed by the combined action of the chill roll and mold unit 14 and roller 16. With respect to the chill roll and mold unit 14, a series of molds 18 are positioned at spaced intervals along the periphery of the roll. Positioned within these molds are ejectors 20 whose top surface forms the bottom surface of the mold when the mold is in an open position either to receive a portion of cheese therein or while carrying the cheese deposited therein throughout a portion of the travel of the roll. The ejectors 20 are mounted on ejector rods 22 which are in turn connected to cam followers 24. The cam followers 24 travel along the box cam 26 which is incorporated in a stationary section within the roll 14. Conveyor belt 28 cooperates with the chill roll 14 along a portion of its travel and aids in retaining the cheese slices 30 undergoing chilling within the molds 18. Coolant passageways 31 are positioned internally within the chill roll 14 to allow circulation of the coolant throughout the roll. Additional chilled rollers 32 in turn aid in maintaining conveyor belt 28 in close association with chill roll 14 during its period of cooperation with the chill roll. These additional rollers 32 may be chilled by suitable means such as that described in the Kraft Patent No. 2,361,775 so as to aid in the quick chilling of the outer surface of the molded slices. Stripper blade 34 aids in the removal of cheese slices 30 from the top surface of the ejectors 20 when the ejectors are in an extended position and the top surface is flush with the outer surface of chill roll 14. Roller 36 controls the movement of conveyor belt 28 onto which cheese slices 30 are ejected from the chill roll and mold unit 14. Rollers 38, 40, and 16 further aid in directing the movement of conveyor belt 28. Seals 42 and 44 are positioned along the bottom edge of hopper 10 and form a tight seal between hopper 10, chill roll 14 and roller 16. Sealing between chill roll 14 and roller 16 is brought about by conveyor belt 28 along with the close association of chill roll 14 and roller 16.

In the operation of the apparatus shown, molten cheese is maintained within the hopper 10 and is thus in close contact with the section of chill roll 14 which at any one time comes within the position between seal 42 and contact with roller 16. Chill roll 14 rotates as shown by the arrow and, due to the action of the box cam 26 during its rotation, the ejectors 20 are fully extended within the molds 18 along that portion of the roll which enters into contact with the molten cheese body 12. The constituents of the cheese which form the surface which comes into contact with the surface of the chill roll 14, become oriented in accordance with a phenomenon similar to surface tension. As any one mold enters into contact with the cheese body within the hopper, this orientation of cheese constituents takes place directly over the top surface of the extended ejector. The fact that the ejector is fully extended at the time of entry of the mold within the hopper allows the cheese constituents to become oriented directly over the mold and along the entire surface of the chill roll. As the mold continues its travel within the cheese hopper, the ejector is slowly withdrawn so as to present to the cheese body an open mold. Due to this slow withdrawal, the weight of cheese directly over the mold forces a quantity of cheese within the mold. The oriented cheese constituents along the surface of the cheese being slowly forced within the mold retain their orientation with respect to one another. Consequently the bottom surface of the quantity of molten cheese introduced into the mold is made up from oriented cheese constituents and retains all of the characteristics and physical properties which are necessary to provide surface tension to a liquid or fluidized material. The distance in travel of the ejectors 20 is determined by the desired thickness of the individual cheese slice.

Each mold, while in contact with the molten cheese body, is filled as described above. Subsequent to the filling operation and prior to the removal of each mold from contact with the molten cheese body, the filled mold is leveled off to a level corresponding to the outer surface of chill roll 14. This leveling action is carried out by contact of chill roll 14 with conveyor belt 28 which is reinforced and held firm against chill roll 14 by roller 16. When such contact is made with roller 16 the source of hot molten cheese is cut off from the mold and the amount of cheese sufficient to form a cheese slice is trapped within the mold. As the travel of the mold continues in the direction of the arrow shown, the conveyor belt 28 comes into contact with the surface of the chill roll 14 and is transferred in its travel from roller 16 to chill roll 14. The cheese within each individual mold is thereby continuously held within the mold for a time long enough to allow the chilling action of the mold to set up the cheese sufficiently to allow handling thereof. This chilling action is further aided by contact of the outer surface of the individual cheese slice held within the mold with the series of chilled rollers 32. During this contact the conveyor belt 28 holds the cheese slices within the molds. The chilled rollers 32 have additional utility in that they further aid in maintaining the close proximity of conveyor belt 28 to chill roll 14. Conveyor belt 28 should be of smooth material in order to provide each individual slice of cheese held within the mold with a smooth outer surface.

Upon the conclusion of the mold travel along rollers 32, the conveyor belt 28 is withdrawn from close contact with chill roll 14 and its direction is controlled and changed by roller 36. As a result, the mold is opened and the cheese slice is ready for removal. At this point of the operation, the box cam 26 operates the cam follower 24 whereby the ejectors are moved outwardly into their initial position and their top surfaces are again parallel with the outer surface of chill roll 14. Due to this action, the cheese slice is forced from within the mold as the mold is closed from within. The cheese slice may fall of its own accord from the top surface of the ejector but if there is any possibility that it might cling to the surface, stripper blade 34 is provided to aid in the removal of the slice from the surface at the proper time in the operation. The main function for the stripper blade 34 is to insure against the sticking of any individual slice onto the surface of the chill roll and the carrying of the slice to such a point where the efficiency of the operation is endangered. The slices of cheese as they are removed from the chill roll are deposited onto conveyor belt 28 and are transferred by the conveyor belt to a point shown in the drawing as A where they are stacked and subsequently packaged. The stacking and packaging portion of the operation is conventional and any suitable apparatus may be utilized. The conveyor belt 28 continues its travel as directed by rollers 38 and 40 and eventually returns to roller 16 where the cycle is repeated in conjunction with each individual mold incorporated in chill roll 14.

Process cheese can be considered to be a fat-in-water emulsion and can be defined as a colloidal sol in which the continuous phase is water which contains dissolved minerals, organic materials, and salts. It has been found that the sudden chilling of a fluidized fat-in-water emulsion does not overcome the inherent tacky characteristics of the solidified surface of such an emulsion. There is not sufficient firmness present following the setting up of the constituents to provide to the material a relatively non-tacky surface. It is also well known that a salt solution containing dissolved organic materials will not set up until a crystalline structure is formed as a result of a sufficient reduction in temperature. It has further been found that the combination of a fat-in-water emulsion which contains salts and dissolved organic materials will also form tacky surfaces under quick-chill conditions. This latter type of material could normally be considered similar to the composition of process cheese. However, it does not react to form an oriented surface as does process cheese. It is difficult to explain the reasons why some of the process cheese constituents orient in such a manner as to provide non-tacky surfaces to the cheese following the setting up of the cheese. Such a phenomenon can be explained as due to the fact that some of the cheese protein particles, when heated, move so as to orient in such a manner as to produce an effect on the surface tension of the liquid in which the particles are suspended. A subsequent quick chilling of the cheese preserves this orientation.

Non-tacky surfaces can be provided to other proteinaceous material, such as gelatin and glue. However, such non-tacky surfaces are obtained by drying the surface portion of such material. Process cheese surfaces cannot be made non-tacky merely by drying the surfaces, unless it is immaterial whether or not the protein material forming the surface is denatured. In other words, if the drying process was utilized in the production of non-tacky cheese surfaces, the nature of the protein along the surface portions of the cheese would be altered. This is normally considered undesirable. However, the removing of excess moisture from cheese surfaces subsequent to the formation of surfaces containing oriented constituents is considered preferable. The removal of this excess surface moisture does not bring about denaturation of the protein, as it is not carried far enough.

By the terms constituents and particles it is meant those materials which may be classed as soluble or insoluble carbohydrates, proteins, minerals, and fatty compounds. The combining of the aforementioned material in the form as set forth above results in the formulation of process cheese products.

Each individual cheese slice produced in accordance with the teachings of the present invention contains at least one surface which is made up of oriented cheese constituents. In the subsequent packaging and stacking of such slices, it has been found that a cheese surface made from oriented cheese constituents does not materially adhere to another cheese surface. Therefore, upon subsequent use of such cheese slices, it has been found that each individual slice may be readily removed from the stack without rupturing or tearing acompanying the operation. In conjunction with the particular form of apparatus shown, both surfaces of a cheese slice exhibit relatively non-adherent characteristics. The one surface which is formed from oriented cheese constituents generally will not exhibit any tacky characteristics at all, while the other surface which has been subjected to the evenness of the conveyor belt and the chilling action of the chilled rollers exhibits relatively non-tacky characteristics. The presence of such characteristics on either surface is not noticeable to the eye and no tough skin is formed. For all practical purposes the individual cheese slice is unchanged in appearance or workability, but it is quite obvious that when such slices are utilized in a package, such a package is readily separated into individual slices without the difficulties heretofore present.

No specific drive means is shown for the operation of any portion of the apparatus set forth as any suitable driving means may be utilized. The chill roll 14 may be refrigerated in any suitable manner and hopper 10 may be heated to maintain the molten condition of the cheese therein. Seal 44 cooperates with conveyor belt 28 traveling over roller 16 so as to completely enclose the cheese within the hopper 10 and alleviate any seepage at this point of contact. Any suitable manner of sealing may be utilized.

It should be understood that the apparatus shown in conjunction with the method of the present invention is nothing more than a suitable means for carrying out the method. As can be readily seen from the description set forth, individual cheese slices are produced which do not need to be trimmed prior to the stacking and packaging operation. No waste is present and each quantity of cheese removed from the individual molds of chill roll 14 is a perfectly dimensioned cheese slice. The apparatus set forth is compact and of comparatively simple structure. Its operation may be made completely automatic and its maintenance is relatively inexpensive. The chill roll may be made from any suitable material and may contain as many individual mold units as desired. The conveyor belt may also be formed from any suitable flexible material having a smooth surface. The width of the conveyor belt should correspond with the width of the chill roll and it is preferred that the necessary guide rollers also be of equal width so as to properly control the movement of the belt. The box cam is mounted within the hollow core of the chill roll as can be seen in the drawing. The chill roll revolves around the box cam and the cam followers are actuated accordingly. The number of box cams necessary will depend on the number of series of molds.

Obviously many modifications and variations of the invention as hereinbefore set forth may be made without departing from the spirit and scope thereof, and therefore only such limitations should be imposed as are indicated in the appended claim.

I claim:

A device for use in the production of slabs of cheese or the like of a given thickness, said device including a chill roll mounted for rotation about its longitudinal axis, coolant passageways positioned internally of said roller, means connected to said roll for removing heat therefrom, said roll having a plurality of molding cavities spaced about the periphery thereof, an ejector member in each of said cavities, said ejector members having an outer face of the same curvature as the curvature of the periphery of said roll, each of said ejector members being movable between a first position at which the outer face of the member is even with the portions of the periphery of the roll immediately to each side of the cavity and a second position at which the ejector member is inwardly of the periphery of the roll a distance corresponding to said thickness, a roller rotatably mounted immediately adjacent said chill roll, an endless belt passing about the upper portion of said roller and the lower portion of said chill roll and moving away from said chill roll at a point along the chill roll beyond the lower portion of the chill roll, a scraper blade contacting the surface of said chill roll between said last mentioned point and the upper portion of said chill roll, said roller being positioned to press said belt against said chill roll at a point defined by a line between the longitudinal axes of the chill roll and the roller, a fluid cheese receptacle positioned above said chill roll and said roller with the walls of the receptacle meeting said chill roll and said roller at spaced points at opposite sides of the point at which said roller presses said belt against said chill roll with said edges of said receptacle forming seals with said chill roll and said roller at said points, means to rotate said chill roll, said roller and said belt in a direction such that the belt moves about the top of the roller across underneath said receptacle and thence about the bottom of said chill roll, means to move the ejector in each cavity to the first position until the cavity is wholly within said receptacle, then to move the ejector to the second position while the cavity is within said receptacle, to maintain said ejector in said second position until after the point at which the belt moves away from the bottom of the chill roll is passed, and then to return the ejector to the first position, a plurality of small rollers in contact with the belt between the point at which the roller presses the belt against the chill roll and the point at which the belt leaves the chill roll, and means to cool said plurality of small rollers.

References Cited in the file of this patent

UNITED STATES PATENTS

| | | |
|---|---|---|
| Re. 16,076 | Crouch | May 19, 1925 |
| 636,839 | Pecht | Nov. 14, 1899 |
| 694,394 | Lee et al. | Mar. 4, 1902 |
| 725,065 | Franke | Apr. 14, 1903 |
| 807,420 | Copland | Dec. 12, 1905 |
| 810,193 | Daum | Jan. 16, 1906 |
| 859,918 | Colborne | July 16, 1907 |
| 1,272,073 | Majewski | July 9, 1918 |
| 1,473,590 | Wallace | Nov. 6, 1923 |
| 1,650,981 | Crouch | Nov. 29, 1927 |
| 2,200,513 | Mitchel et al. | May 14, 1940 |
| 2,200,514 | Mitchel et al. | May 14, 1940 |
| 2,361,775 | Kraft | Oct. 31, 1944 |
| 2,651,808 | Burnett et al. | Sept. 15, 1953 |
| 2,654,151 | Miollis | Oct. 6, 1953 |
| 2,657,994 | Miollis | Nov. 3, 1953 |

FOREIGN PATENTS

| | | |
|---|---|---|
| 470,759 | France | June 23, 1914 |
| 769,432 | France | June 9, 1934 |